United States Patent

Neal et al.

[15] 3,706,849

[45] Dec. 19, 1972

[54] COLOR IMAGE DISPLAY SYSTEM EMPLOYING ALTERED SCANNING

[72] Inventors: Charles Bailey Neal; Benton Boyd Scott, both of Batavia, N.Y.

[73] Assignee: GTE Sylvania Incorporated

[22] Filed: Dec. 30, 1968

[21] Appl. No.: 787,725

[52] U.S. Cl. ..........................178/5.2 D, 178/DIG. 28

[51] Int. Cl. ..................................................H04n 9/02

[58] Field of Search ..........178/5.2 D, 6.7 A, DIG. 28

[56] References Cited

UNITED STATES PATENTS

| | | | |
|---|---|---|---|
| 2,523,156 | 9/1950 | Somers | 178/7.2 D |
| 2,625,602 | 1/1953 | Somers | 178/7.2 D |
| 3,270,131 | 8/1966 | Dinter | 178/6.8 |

*Primary Examiner*—Robert L. Griffin
*Assistant Examiner*—George G. Stellar
*Attorney*—Norman J. O'Malley, Cyril A. Krenzer and Thomas H. Buffton

[57] ABSTRACT

A system for providing a color image display derived from color television signals and photographic film includes a color image reproducer; first signal source means responsive to color television signal to provide signals representative of luminance, chrominance and synchronizing information; second signal source means including a flying spot scanner tube with two vertical deflection yokes to receive normal and correction scan signals, responsive to light-scanned photographic film to provide signals representative of luminance and chrominance information; transport means for effecting conveyance of a film through said second signal source means and synchronization of said film conveyance and said first signal source means; and switching means for selective coupling of signals representative of luminance and chrominance information from said first and second signal source means to said color image reproducer.

1 Claim, 7 Drawing Figures

PATENTED DEC 19 1972

3,706,849

SHEET 1 OF 4

INVENTORS
CHARLES B. NEAL &
BENTON B. SCOTT

BY

Cyril A. Kunze
ATTORNEY

INVENTORS
CHARLES B. NEAL &
BENTON B. SCOTT

BY

Cyril A. Krenzer
ATTORNEY

INVENTORS
CHARLES B. NEAL &
BENTON B. SCOTT
BY
Gail A. Kunzer
ATTORNEY

COLOR IMAGE DISPLAY SYSTEM EMPLOYING ALTERED SCANNING

CROSS REFERENCE TO OTHER APPLICATIONS

Copending application Ser. No. 657,623 now U.S. Pat. No. 3,553,352, filed Aug. 1, 1967, titled "Color Reproduction System" relates to apparatus for selectively applying signals from a first and second signal source to a color image reproducer to effect a color image display derived from received signals and film. Also, copending application, Ser. No. 758,908 now U.S. Pat. No. 3,548,081 titled "Visual Display System" filed Sept. 10, 1968 and assigned to the assignee of the present application relates to apparatus which includes an image reproducer, first and second signal sources, and a switching means and adapter for selective direct coupling of signals from the first and second signal source to the reproducer.

BACKGROUND OF THE INVENTION

Generally, color image display systems are best known in the form of a color television camera and transmitter in conjunction with a color television receiver. In the usual manner, the color television camera employs an image storage device such as a vidicon to provide color television signals derived from a viewed scene or from photographic films. In turn, the color television signals are transmitted, intercepted, and processed by a color television receiver to provide a color image display.

Unfortunately, apparatus necessary to the above-mentioned color image display systems is of the so-called "commercial" rather than "consumer" type. Obviously, "commercial" apparatus is not readily available to a consumer, is usually relatively expensive and complex, and is neither operable, available or particularly applicable to the provision of a color image display by an untrained viewer. Thus, it is highly unlikely that an average consumer, desirous of providing a color image display from film such as a home movie film, would invest in the apparatus available and the training necessary to provide such a display.

Other known forms of color image display systems include a flying spot scanner system wherein a flying spot scanner tube in conjunction with photographic film and a projector are employed to provide a color image display. Therein, film conveyed by the projector is light scanned by the flying spot scanner tube to provide signals which are applied to a color image reproducer.

Although such systems have received widespread acceptance in some areas, general TV studio use is one area wherein such systems have been found somewhat lacking in operational achievement. More specifically, the above-mentioned flying spot scanner system is suitable for providing a color image display from photographic film but includes no provision whatever for providing a color image display derived from color television signals as would be required in a consumer product.

Also, the above-mentioned flying spot scanner system requires some form of apparatus for immobilizing a photographic film insofar as a viewer is concerned. In other words, continuously moving or shifting film frames, such as a movie film, must appear as a single viewed slide in order to prevent undesired movement and blurring of the color image display.

One known form of immobilization apparatus employed with flying spot scanner systems is a continuous motion type of projector. Therein, a moving prism or lens system operates in conjunction with a continuous motion of the photographic film to provide a gradual disappearance of one scene and replacement thereof by another scene in a so-called lap-dissolve system.

Although such systems for film immobilization have been employed in so-called "commercial" type apparatus, it has been found that such systems are relatively expensive and employ different optical paths to derive successive frame images. This employment of differing optical paths has thus far been found prohibitive to a "consumer" type product because of excessive cost and the degree of perfection required of the optical apparatus.

Another known system for providing a color image display derived from photographic film is the so-called intermittent pull-down system. Herein, each one of a plurality of photographic film frames is scanned by a light beam while in the same physical location. These film frames scanned by the light beam, in association with photomultiplier and cooperative processing stages, provide color signals which are applied to a color image reproducer. This color image reproducer has an electron beam trace period during which a color image display observable by a viewer is provided and an electron beam retrace period during which time the color image reproducer is blanked providing no image display observable by a viewer.

In order to effect immobilization of a photographic film in such an intermittent pull-down type system, it has been found that vertical movement of the film must be effected in a manner such that the scan or trace period of the electron beam of a color image reproducer is substantially unaffected insofar as a viewer is concerned. In other words, vertical movement of the photographic film must be hidden or unobservable to a viewer of the color image reproducer and any one of a number of techniques may be employed. Moreover, such techniques as vertical overscanning of the color image reproducer, vertical scan correction and increased film pull-down speeds are applicable and appropriate means for binding such vertical movement.

OBJECTS AND SUMMARY OF THE INVENTIOn

An object of the present invention is to provide an enhanced color image display system. Another object of the invention is to provide an improved system for displaying images derived from photographic films and from color television signals. Still another object of the present invention is to synchronize the conveyance of a photographic film through a flying spot scanner system and the electron beam scanning of a color image reproducer.

These and other objects are achieved in one aspect of the invention by a color image display system which includes a first source of signals responsive to color television signals, a second source of signals responsive to light scanned photographic film, a color image reproducer, switching means for selectively applying signals to the color image reproducer from the first and second signal sources, and transport means for effecting conveyance of the photographic film through the second source of signals and synchronization of the film movement with electron beam scanning of a color image reproducer.

DESCRIPTION OF THE PREFERRED EMBODIMENT

The present invention, together with other and further objects, advantages and capabilities thereof will be best understood when considered in conjunction with the following disclosure, appended claims, and accompanying drawings.

Figure 1:
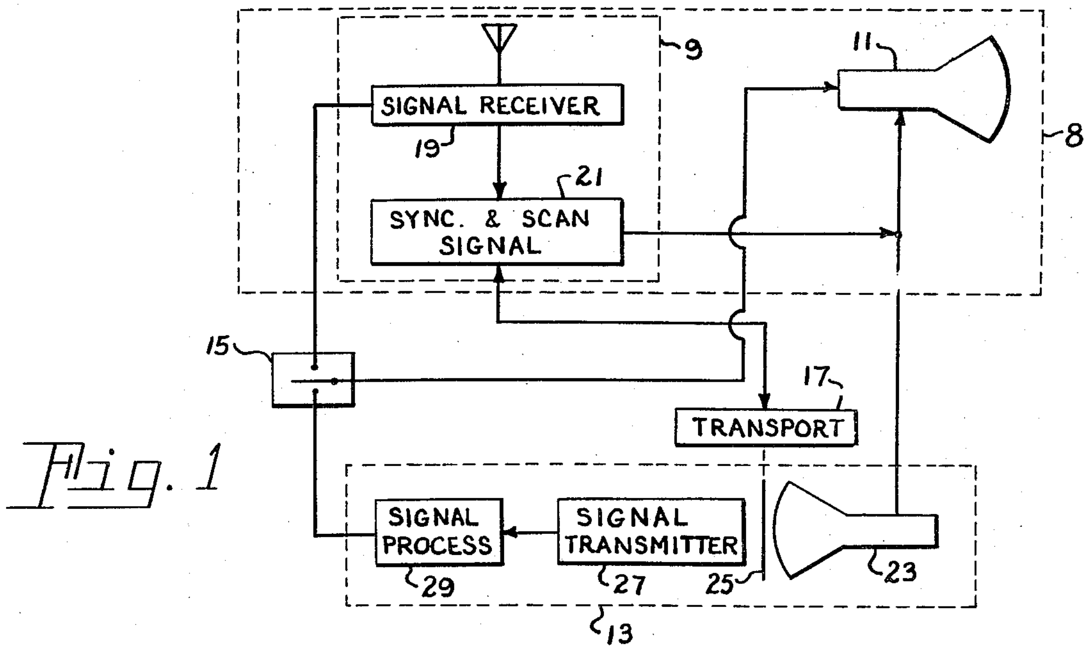
FIG. 1 is a diagrammatic illustration, in block form, of one embodiment of a color image display system.

Referring to the drawings, FIG. 1 illustrates a color image display system including a color television receiver 8 having a first source of signals 9 and a color image reproducer 11 and a second source of signals 13 in the form of a flying spot scanner system. The first and second signal sources 9 and 13 are connected to a switching means 15 for selective coupling of signals therefrom to the color image reproducer 11. Also, the first and second signal sources 9 and 13 are intercoupled by a transport means 17 for effecting conveyance of a photographic film through the second signal source 13 and synchronization of the first and second signal sources 9 and 13. The first signal source 9 includes a signal receiver stage 19 and a synchronizing and scanning stage 21 coupled thereto. The second signal source 13 embodies a flying spot scanner tube 23, a film holder 25 substantially adjacent thereto, a signal transmitter stage 27 closely associated with the film holder 25, and a signal processing stage 29 coupled to the signal transmitter stage 27.

As to the provision of a color image display derived from both color television signals and photographic films, the signal receiver stage 19 of the first signal source 9 derives signals representative of luminance and chrominance information from intercepted color television signals and applies these derived signals to the switching means 15. The second signal source 13 in cooperation with the film transport means 17 derives signals representative of luminance and chrominance information from the photographic film and applies these derived signals to the switching means 15. In turn, the switching means 15 selectively couples these applied signals representative of luminance and chrominance information to the color image reproducer 11 of the color television receiver 8 to provide a visual image display.

Also, the synchronizing and scanning stage 21 of the first signal source 9 responds to the signal receiver stage 19 to cause development of synchronizing and scanning signals in response to color television signals. The transport means 17 effects conveyance of a photographic film through the second source of signals 13 and development of synchronizing and scanning signals which are selectively applied to the synchronizing and scanning stage 21. These selected synchronizing and scanning signals of the synchronizing and scanning stage 21 are, in turn, applied to the color image reproducer 11 and to the flying spot scanner tube 23 to effect electron beam deflection and scanning thereof, In operation, a color television signal intercepted by the first source of signals 9 provides luminance and chrominance information which is applied via a switching means 15 to the color image reproducer 11. Also, synchronizing and scanning signals derived from the intercepted color television signals are applied via the synchronizing and scanning signal stage 21 to the color image reproducer 11 to effect a color image display.

Alternatively, a color image display derived from photographic film is effected by activation of the transport means 17 and the second source of signals 13. The transport means effects conveyance of a film through the second source of signals 13 to provide signals representative of luminance and chrominance information which are selectively applied to the color image reproducer 11 via the switching means 15. Also, the transport means 17 causes development and application of signals to the synchronizing and scanning stage 21 of the first signal source 9 which, in turn, effects synchronization of electron beam scanning of the color image reproducer 11 and flying spot scanner tube 23 with respect to film conveyance through the second source of signals 13.

Thus, the first source of signals 9, the color image reproducer 11, and the switching means 15 are employed to effect a color image display derived from color television signals. Moreover, the first and second source of signals 9 and 13, the switching means 15, the transport means 17, and the color image reproducer 11 are employed to effect a color image display derived from photographic film.

Further, the switching means 15 causes selective application to the color image reproducer 11 of signals representative of luminance and chrominance information available from the first and second signal sources 9 and 13. Also, the synchronizing and scanning stage 21 of the first signal source 9 selectively responds to synchronizing information derived from color television signals and from the transport means 17 to effect synchronization of electron beam scanning of the color image reproducer 11 and flying spot scanner tube 23 and conveyance of a film through the second source of signals 13.

Figure 2:
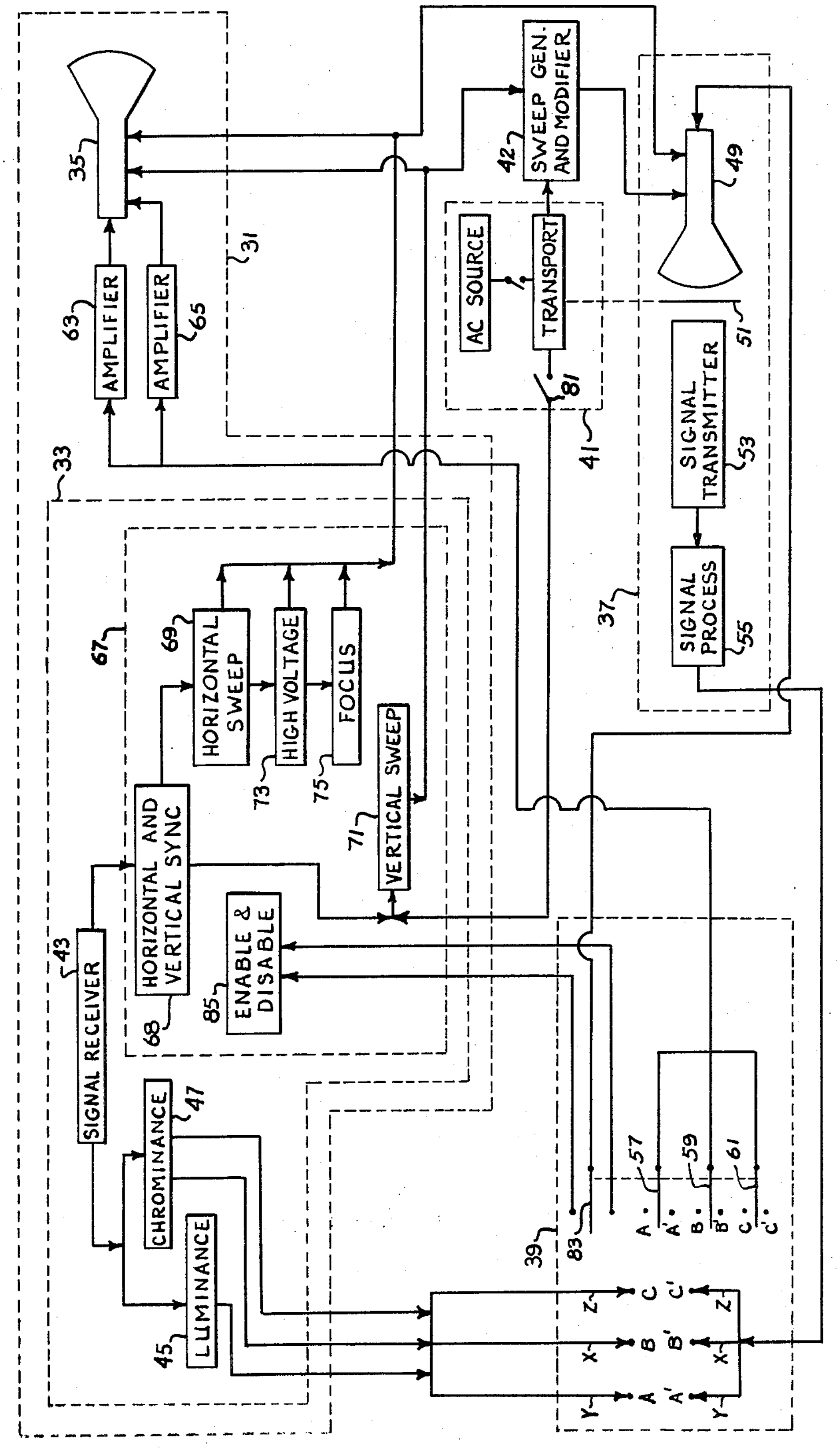
FIG. 2 is a block diagram illustrating a preferred form of color image display system.

As a specific illustration of one preferred form of color image display system, reference is made to the diagrammatic illustration of FIG. 2. This color image display system includes a color television receiver 31 having a first source of signals 33 and a color image reproducer 35 and a second source of signals 37. A switching means 39, a transport means 41, and a sweep generator and modifier stage 42 coupled thereto serve to selectively interconnect the first and second signal sources 33 and 37.

The first source of signals 33 of the color television receiver 31 includes a signal receiver stage 43 having the usual RF and IF amplification and detection stages commonly employed in the ordinary color television receiver. In the normal manner, a luminance channel 45 and a chrominance channel 47 are coupled to the signal receiver stage 43 to effect development of signals representative of luminance information or Y signals and signals representative of chrominance information or X and Z signals. These signals, Y, X and Z, are applied to a plurality of contacts A, B, and C of the switching means 39.

The second source of signals 37 includes a flying spot scanner tube 49 which provides a scanning light beam. This light beam is directed onto a photographic film disposed within the film holder 51 to provide signals in the signal transmitter and process stages 53 and 55 representative of luminance or Y and chrominance X and Z information which, in turn, are applied to a plurality of contacts A′, B′, and C′ of the switching means 39.

In addition to the contacts, A, B, C, and A′, B′, C′, the switching means 39 includes a plurality of ganged and positionally alterable arms 57, 59, and 61 respectively. Each of these alterable arms is associated with one of the contact pairs A—A′; B—B′; and C—C′. Also, each one of the alterable arms 57, 59 and 61 is coupled by way of one of a pair of amplifier stages 63 and 65 to the color image reproducer 35.

Thus, signals representative of luminance and chrominance information derived from color television signals are available at the contacts A, B, and C. Signals representative of luminance and chrominance information derived from photographic film are available at the contacts A′, B′, and C′. Moreover, these signals are derived from the first and second signal sources 33 and 37 and applied to the contacts A, B, and C and A′, B′, and C′. Then, the switching means 39 selectively applies the signals to the color image reproducer 35 to provide a color image display derived from color television signals or photographic film. Obviously, color difference signals, as well as signals representative of the colors red, green, and blue, are equally applicable and appropriate.

As to synchronization, the first source of signals 33 includes the signal receiver stage 43 wherein signals derived from intercepted color television signals are applied to a synchronizing and scanning system 67. This synchronizing and scanning system 67 includes a horizontal and vertical synchronizing stage 68 wherefrom synchronizing signals at a horizontal deflection frequency are applied to a horizontal sweep stage 69 and synchronizing signals at a vertical deflection frequency are applied to a vertical sweep stage 71.

The horizontal sweep stage 69 is coupled to a high voltage stage 73 which is, in turn, coupled to a focus voltage stage 75. All of the stages, the horizontal sweep stage 69, the high voltage stage 73, and the focus voltage stage 75 are coupled to the color image reproducer 35 of the color television receiver 31 and to the flying spot scanner tube 49 of the second source of signals 37.

The vertical sweep stage 71 is also coupled to the color image reproducer 35 of the color television receiver 31 and by way of the sweep generator and modifier stage 42 to the flying spot scanner tube 49 of the second source of signals 37. Thus, electron beam scanning of the color image reproducer 35 is controlled by signals from the vertical sweep stage 71. Moreover, electron beam scanning of the flying spot scanner tube 49 is controlled by signals from the vertical sweep stage 71 when the second source of signals 37 is enabled.

A transport means 41 is coupled to the vertical sweep stage 71, the second source of signals 37, and the sweep generator and modifier stage 42. The transport means includes a means for effecting conveyance of a photographic film through the film holder 51 and for developing synchronizing signals in accordance with the conveyance of film as will be explained hereinafter. Moreover, a second switching means 81 is employed to effect application of synchronizing signals developed in the transport means 41 to the vertical sweep stage 71.

Also, the transport means 41 causes development and application of signals at a frequency other than the frequency of the developed synchronizing signals to the sweep generator and modifier stage 42. The sweep generator and modifier stage 42 provides modified sweep signals at a frequency related to the conveyance of the film through the second source of signals 37 and these modified sweep signals are applied to the flying spot scanner tube 49.

Additionally, a third switching means 83 couples the flying spot scanner tube 49 of the second signal source 37 to an enablement and disablement stage 85 of the first signal source 33. This third switching means 83 is ganged to the switching means 39 and operates in conjunction therewith to effect selective enablement and disablement of the flying spot scanner tube 49 in accordance with selected operation of the first and second signal sources 33 and 37. In other words, the flying spot scanner tube 49 is disabled when the first signal source 33 is operative and enabled when the second signal source 37 is operative.

Figure 3:
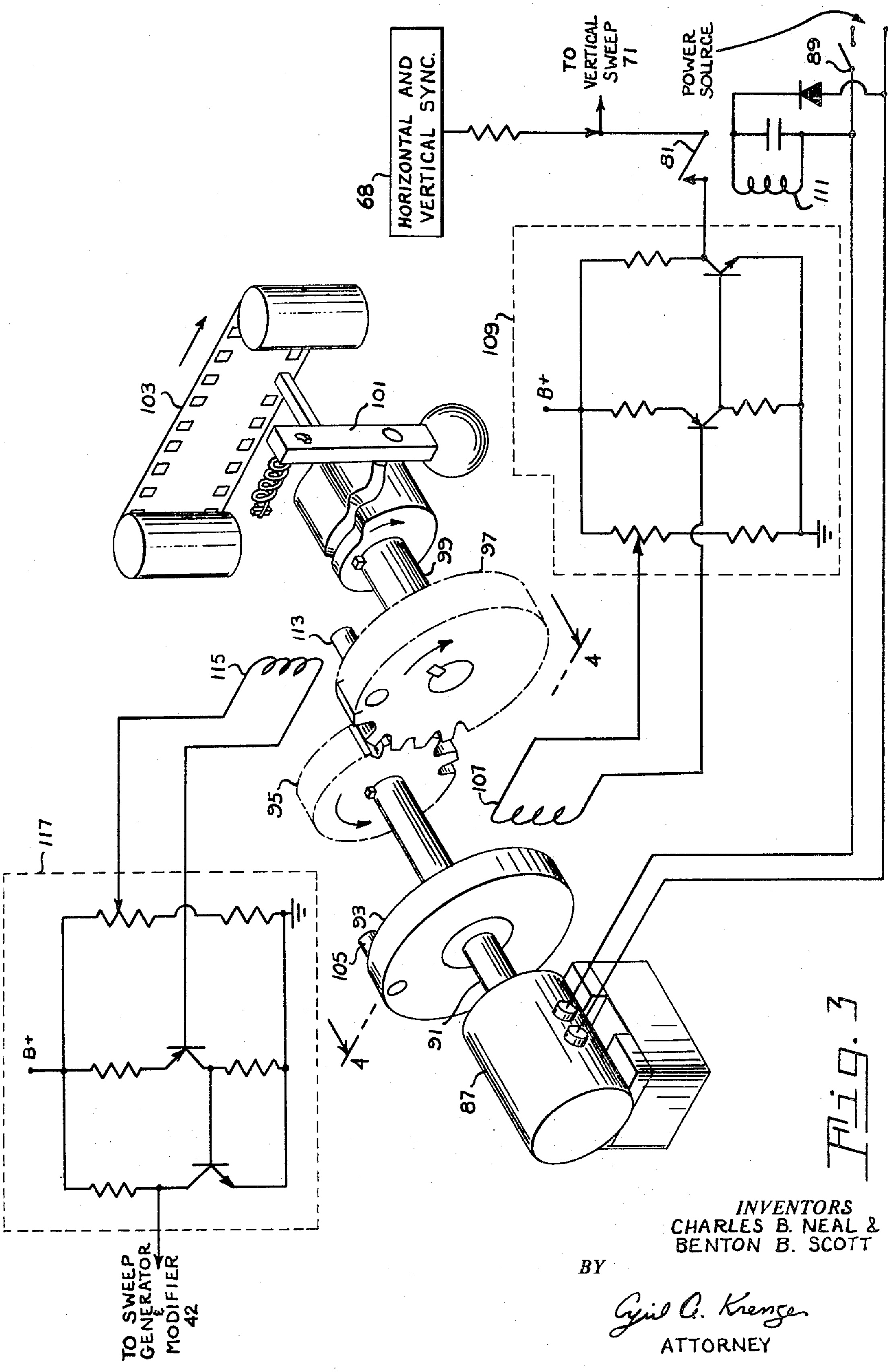
FIG. 3 is a preferred form of transport means suitable to the apparatus of FIG. 2.

Referring to examples of specific apparatus suitable to the above-described preferred form of color image display system, FIG. 3 illustrates a preferred form of transport means 41. The transport means 41 includes a synchronous motor 87 coupled by an ordinary activating switch 89 to a power source. The synchronous motor 87 has an extending shaft member 91 to which is affixed a flywheel 93 and a gear member 95. A second gear member 97 is mechanically coupled to the gear member 95 and affixed to a connecting rod 99 coupled to a claw member 101 formed and disposed to effect movement of a photographic film 103.

The flywheel 93 has a permanent magnet 105 affixed thereto and a pickup coil 107 disposed immediately adjacent thereto in magnetic coupling arrangement with the permanent magnet 105. An amplifier stage 109 adjustably couples the pickup coil 107 to the second switching means 81 which, in turn, couples synchronizing signals from the pickup coil 107 to the vertical sweep stage 71 of the synchronizing and scanning system 67. This second switching means 81 includes a solenoid 111 which serves to cause application of synchronizing signals to the vertical sweep stage 71 from the transport means 41 whenever the activation switch 89 is energized.

Upon energization of the activation switch 89 and closure of the second switching means 81, vertical synchronizing signals from the horizontal and vertical synchronizing stage 68 are bypassed to circuit ground by the relatively low impedance of the amplifier stage 109. Also, the relatively high output signals from the amplifier stage 109 and the relatively high impedance of the horizontal and vertical synchronizing stage 68 combine to cause application of signals from the amplifier stage 109 to the vertical sweep stage 71. Thus, vertical synchronization of the color image reproducer 35 and of the flying spot scanner tube 49 is controlled by the transport means 41 during periods of film transport activation.

Figure 4:
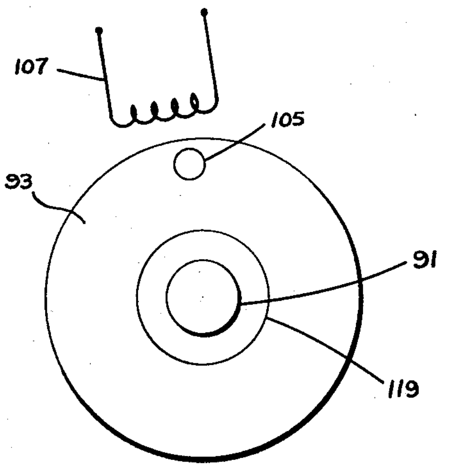
FIG. 4 is a sectional view of the transport means of FIG. 3.

In the sectional plan view of FIG. 4 taken along the line 4—4 of FIG. 3, the flywheel 93 is affixed to the shaft member 91 by means of a resilient pressure deformable bushing 119. This bushing 119, which is preferably of rubber material for instance, has compliance sufficient to insure development of a synchronizing signal of substantially stable and constant frequency by the permanent magnet 105 and pickup coil 107. Thus, the resilient bushing 119 has compliance sufficient to compensate for variations in loading of the flywheel 93 caused by the intermittent contacting relationship of the film 103 and claw member 101.

As to the operation, closing the activating switch 89 energizes the solenoid 111 activating the third switch 81 coupling the amplifier stage 109 to the vertical sweep stage 71. Also, the synchronous motor 87 is energized causing rotation of the shaft member 91, flywheel 93, gear member 95, and permanent magnet 105 to provide a vertical synchronizing signal at a frequency of about 60 cycles per second. Thus, a synchronizing signal of about 60 cycles per second is applied to the vertical sweep stage 71 and thence to the sweep generator and modifier stage 42 to effect vertical scanning of the color image reproducer 35, and the flying spot scanner tube 49.

Further, the first and second gear members 95 and 97 are mechanically coupled to effect activation of the claw member 101 and movement of the film 103 in synchronization with the developed vertical synchronizing signal. Also, the rate of film movement is dependent upon the mechanical coupling of the gear members 95 and 97 which, in turn, varies with the rate of developed vertical synchronizing signals. Preferably, the film 103 is moved at a rate of about 20 frames per second with the movement phased to occur during the period of vertical retrace and vertical trace modification of the flying spot scanner tube 49 as will be explained hereinafter. In a substantially similar manner, the second permanent magnet 113 and pickup coil 115 develop a modifying signal at a rate which is dependent upon the mechanical coupling of the gear members 95 and 97 which, in turn, is in accordance with the time of movement of the film 103. This modifying signal from the pickup coil 115 is applied via the second amplifier means 117 to the sweep generator and modifier stage 42 to effect the above-mentioned modification of the flying spot scanner tube 49 which shall be discussed further.

Additionally, it may be noted that the rotor of the synchronous motor 87 has a relatively low mass which would tend to cause so-called "bounce" when subjected to non-uniform loading. In other words, non-uniform loading of the shaft member 91, due to the intermittent contacting relationship of the claw member 101 and film 103, would tend to cause overrunning and loss of a few degrees of rotational speed of the flywheel 93. As a result, the developed vertical synchronizing signals would tend to vary causing variations in vertical scanning of the color image reproducer 35 and flying spot scanner tube 49.

However, all of the above-listed variations are substantially eliminated by inclusion of the resilient bushing 119 intermittent the shaft member 91 and the flywheel 93. As the non-uniform load of the contacting claw member 101 and film 103 is applied to the shaft member 91 tending to cause a slowing down thereof, the compliance of the bushing 119 tends to cause the rotational speed of the flywheel 93 to remain substantially constant. Thus, the developed vertical synchronizing signal and vertical scan of the color image reproducer 35 and flying spot scanner tube 49 remain substantially unchanged despite the variations in loading of the synchronous motor 87 by intermittent movement of the film 103.

At this point it should perhaps be noted that known low cost, consumer type apparatus for conveying film has a film movement or pull-down time in the range of about 5.5 to 7.0 milliseconds with a practical lower limit of about 3.5 milliseconds while the vertical retrace period of a normal color television receiver lasts about 1.5 milliseconds. Thus, it can be seen that the vertical retrace period of a color television receiver is insufficient to hide the movement of a photographic film by known film conveying apparatus. Accordingly, the viewer of a color image display would normally be subjected to undesired and annoying film movement when viewing a color image display derived from photographic film on a color image reproducer.

However, one technique for substantially eliminating observation of undesired and annoying film movement by a viewer is to provide a means for altering a portion of the electron beam scan of the display device. This alteration in electron beam scanning during the trace period is of a polarity and in an amount sufficient to compensate for the film movement during this period. Moreover, this alteration in electron beam scanning in combination with additional film movement during the electron beam retrace period, the period when scanning is unobservable to the viewer, provides sufficient time to effect intermittent movement of a film in a manner which is unobservable to a viewer.

Figure 5:
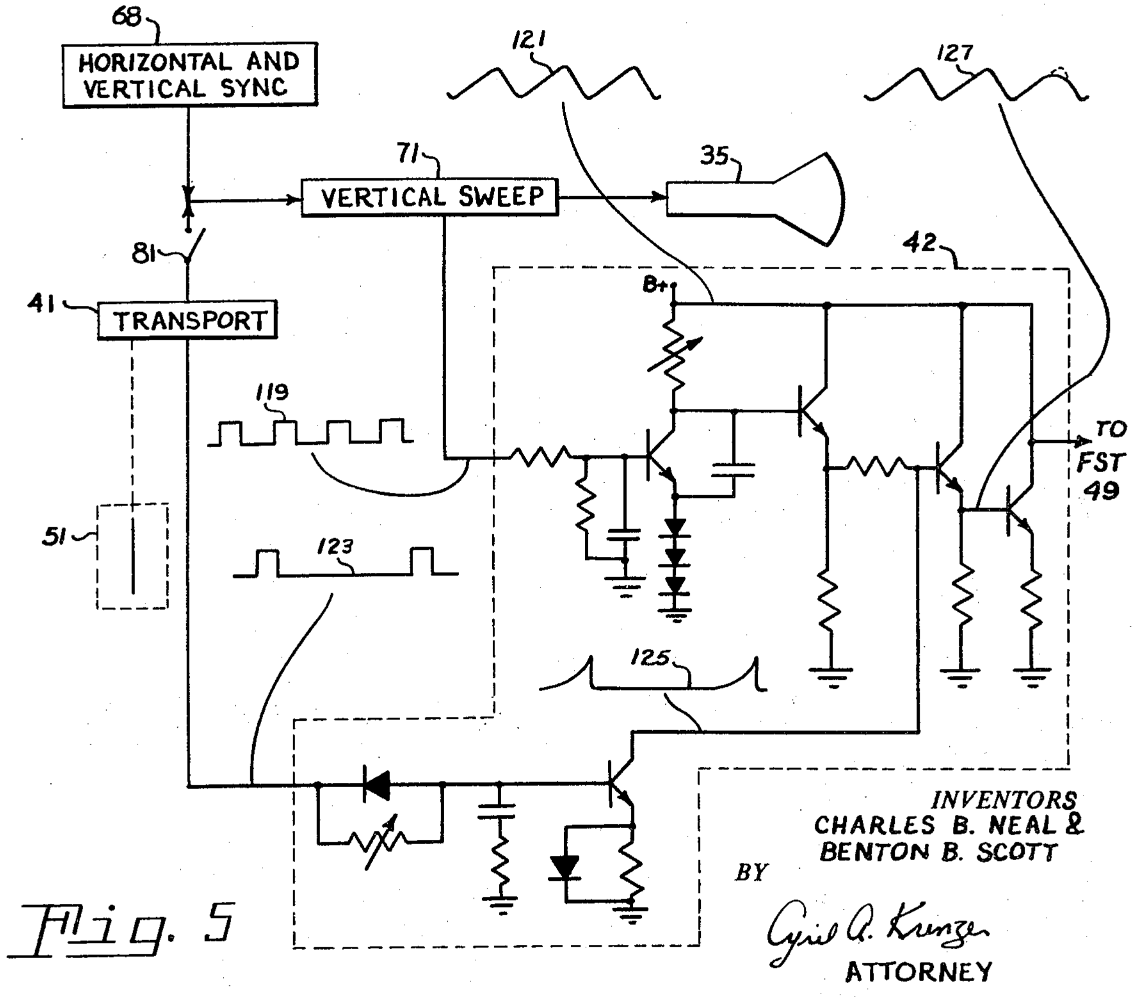
FIG. 5 is a preferred form of sweep generator and modification means suitable to the apparatus of FIG. 2.

Referring to the diagrammatic illustration of FIG. 5, a vertical sweep stage 71 is coupled to the horizontal and vertical synchronizing stage 68 and via a second switching means 81 to the transport means 41. The output, waveform 119, of the vertical sweep stage 71 is applied to the color image reproducer 35 and to the sweep generator and modifier stage 42. Also, a modifying signal, waveform 123, from the transport means 41 is applied to the sweep generator and modifier stage 42 which has an output signal coupled to the flying spot scanner tube 49 of the second source of signals 37.

As to the operation, viewing of a received color television signal or a stationary frame of film does not require activation of the transport means 41. Thus, the second switching means 81 remains in an open position whereupon vertical synchronizing signals from the horizontal and vertical synchronizing stage 68 are applied to the vertical sweep stage 71 which, in turn, causes development and application of vertical sweep signals to the color image reproducer 35. Moreover, the vertical sweep stage 71 is coupled to the sweep generator and modifier stage 42 which, in turn, couples vertical sweep signals to the flying spot scanner tube 49.

Thus, it can be seen that vertical synchronizing signals from an intercepted television signal would provide vertical scanning when television signals are being received as well as during observation of a stationary frame of photographic film. Moreover, the vertical sweep stage 71 is designed in a manner such that the stage 71 is "free-running" to provide vertical synchronizing signals even though there is no signal being received. Thus, vertical scanning is provided at all times eliminating undesired deleterious effects upon the color image reproducer 35 and flying spot scanner tube 49 when a received signal is not present.

When a photographic film having a plurality of frames is to be viewed, the transport means 41 is activated. Thereupon the second switching means 81 is closed and the transport means 41 develops vertical synchronizing signals at a frequency of about 60 cycles per second as well as modifying signals at a frequency of about 20 cycles per second in a manner previously explained in conjunction with FIG. 3. Also, the film is conveyed through the film holder 51 as previously explained.

The vertical synchronizing signals from the transport means 41 are applied via the second switching means 81 to the vertical sweep stage 71. The vertical sweep stage 71 is coupled to and causes vertical electron beam scanning of the color image reproducer 35. Also, synchronizing signals, waveform 119, from the vertical sweep stage 71 are applied to the sweep generator and modifier stage 42. Moreover, modifying synchronizing signals, waveform 123, developed in the transport means 41 and in fixed time relationship with the synchronizing signals, waveform 119, are also applied to the sweep generator and modifier stage 42.

In the sweep generator and modifier stage 42, the vertical synchronizing signals, waveform 119, cause development of a vertical sweep signal, waveform 121. The modifying synchronizing signals, waveform 123, cause development of a modifying signal, waveform 125. In turn, the vertical sweep signal, waveform 121, and the modifying signal, waveform 125, are combined to provide a modified vertical sweep signal, waveform 127, which is applied to the flying spot scanner tube 49 of the second source of signals 37.

Thus, it may be noted that viewing of a received color signal or of a stationary frame of film is effected by employment of "off the air" vertical synchronizing signals applied to the color image reproducer 35 via the horizontal and vertical synchronizing stage 68 and vertical sweep stage 71 and by way of the sweep generator and modifier stage 42 to the flying spot scanner tube 49. Moreover, vertical synchronizing signals are developed in the vertical sweep stage 71 upon interruption or loss of an "off the air" signal.

Further, viewing of a plurality of film frames, as a movie film for instance, is effected by activating the transport means 41 developing vertical synchronizing, as well as modifying synchronizing signals which are applied to the sweep generator and modifier stage 42 to effect development of a modified vertical sweep signal which is applied to the flying spot scanner tube 49. The transport means 41 also causes conveyance of the photographic film frames through the second source of signals 37 and this film movement and modification of the vertical scan signals are combined in proper phase relationship and time such that the vertical movement of the film is unobservable to the viewer of the color image reproducer 35.

Figure 6:
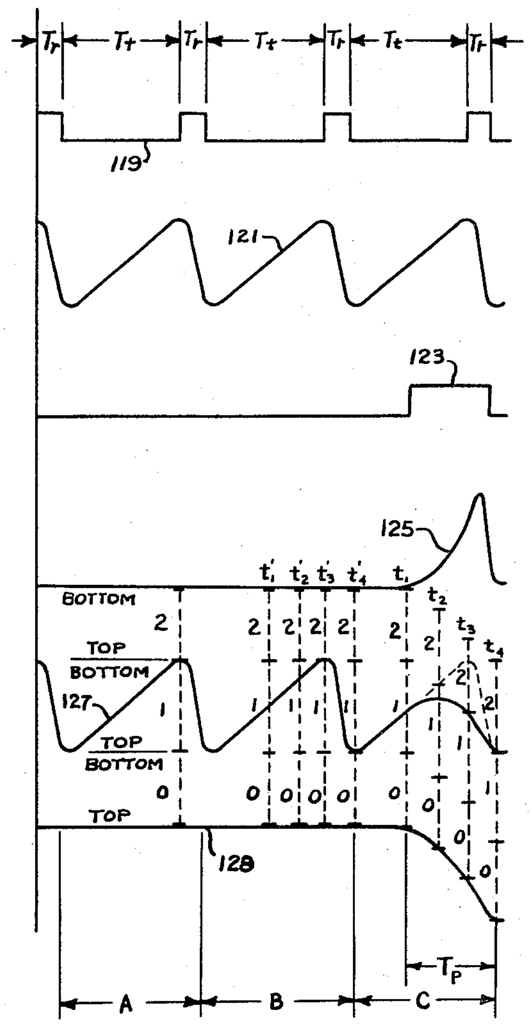
FIG. 6 is a presentation of some waveforms which aid in visualizing the function of the system.

For further explanation and clarification, reference is made to the diagrammatic illustration of FIG. 6 wherein important relationships of time, sweep currents and film displacement are illustrated. Also, FIG. 6 includes the following specific designations: $T_t$-vertical trace period of electron beam scanning of the flying spot scanner tube 49; $T_r$-vertical retrace period; $T_p$-pull-down or movement interval of the photographic film; and $t_1$, $t_2$, $t_3$, and $t_4$ designating electron beam location on a film frame at various time intervals. Also, dotted lines have been combined with the sweep current curves to illustrate electron beam location with respect to specific film frame locations.

In FIG. 6, a vertical synchronizing signal waveform 119 is developed by the vertical sweep stage 71 in response to signals from the transport means 41. In turn, a vertical sweep signal, waveform 121, is developed in the sweep generator and modifier stage 42. Also, modifying signals, waveform 123, provided by the transport means 41 cause development of modifying synchronizing signals, waveform 125, in the sweep generator and modifier stage 42. Therein, the vertical sweep signals, waveform 121, and the modifying synchronizing signals, waveform 125, are combined in proper phase relationship to provide a modified vertical sweep signal, waveform 127.

Referring to the modified vertical sweep signal, waveform 127, the illustration includes first, second and third scan periods, designated A, B, and C, with each of the scan periods A, B, C, including a trace period $T_t$ and a retrace period $T_r$. Also, a plurality of frames of film, designated by dotted lines as frame "0," "1," and "2," each include a top and bottom portion. Moreover, this modified vertical sweep signal, waveform 127, is compared in time relationship with the displacement of the photographic film, curve 128.

As can be readily seen, the modifying signal, waveform 125, remains substantially constant during the first and second scan periods A and B and there is no displacement of the film frames, 0, 1, and 2. Thus, the modified vertical sweep, waveform 127, remains essentially as the vertical sweep signal, waveform 121, during these first and second scan periods A and B.

However, in the third scan period, Period C, the modifying signal, waveform 125, varies at a rate substantially equal to the rate of displacement of the film, curve 128. This modifying signal, waveform 125, combined with the vertical sweep signal, waveform 121, provides a deviation or modification of the vertical sweep signal, waveform 121, in an amount and of a phase which compensates for the film displacement, curve 128, as illustrated by the third scan period C of waveform 127. Moreover, it can be seen that the deviation of the modified sweep current, waveform 127, during the time periods $t_1$–$t_2$ and $t_2$–$t_3$ must be proportional to the film displacement since this modification occurs during the trace period $T_t$ which is observable to a viewer. Thus, the resulting electron beam location with respect to the film frame is substantially identical at locations $t_1$, $t_2$, and $t_3$ and $t_1'$, $t_2'$ and $t_3'$. The time period $t_3$–$t_4$ occurs during the retrace period $T_r$ when the system is blanked whereby the displacement rate of the film, curve 128, and the shape of the modifying signal, waveform 125, are not necessarily proportional since the image is unobservable to a viewer.

Additionally, it should be noted that the above-described embodiment relates to the employment of a single deflection yoke for the flying spot scanner tube 49 and the application thereto of a vertical scan signal or a modified vertical scan signal. As previously mentioned, vertical scan signals are employed for received color television signals and observation of a single film frame while modified vertical scan signals are employed to effect compensation for film displacement when a film is conveyed by the transport means.

Figure 7:
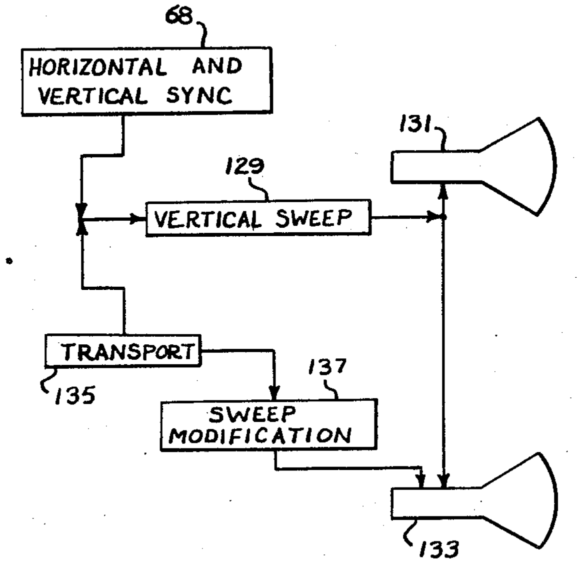
FIG. 7 is an alternative form of color image display system applicable to the illustration of FIG. 2.

FIG. 7 illustrates an alternative embodiment of a color image display system. Herein, vertical sweep signals from a vertical sweep signal stage 129 are applied to parallel connected vertical deflection yokes of a color image reproducer 131 and a flying spot scanner tube 133. Also, modifying signals from a transport means 135 are applied via a sweep modification stage 137 to another vertical deflection yoke of the flying spot scanner tube 133. Thus, the plurality of signals applied to plural yokes of the flying spot scanner tube 133 are combined within the scanner tube 133 to effect modified scanning thereof as explained with regard to the illustration of FIG. 6 and embodiment of FIG. 2.

Thus, there has been provided an enhanced system for providing a color image display derived from both color television signals and photographic films. The system includes means for effecting conveyance of a photographic film through a second source of signals and for effecting synchronization of the film conveyance and the color image display. The system also includes means for modifying the vertical scanning of the system in a manner such that displacement of the film by the transport means is not observable to a viewer of the color image reproduction means.

While there has been shown and described what is at present considered the preferred embodiments of the invention, it will be understood that various changes and modifications may be made therein without departing from the invention as defined by the appended claims.

We claim:

1. A color image display system comprising in combination: a color television receiver including first signal source means providing signals representative of luminance, chrominance, synchronizing, and deflection information and color image reproducer means coupled to said source of signals representative of deflection information of said first signal source means; second signal source means in the form of a flying spot scanner system providing signals representative of luminance and chrominance information and including a flying spot scanner tube and multiple units of deflection apparatus associated therewith, said flying spot scanner tube being coupled to said image reproducer means and said source of signals representative of deflection information of said first signal source; transport means for effecting conveyance of a photographic film through said second signal source means and coupled to said first signal source means for effecting synchronization therebetween, said transport means includes means for developing synchronized signals for effecting vertical deflection of an electron beam of said color image reproducer and means for effecting alteration in vertical deflection of an electron beam of said flying spot scanner tube in accordance with the operation of said transport means, and said transport means further includes means for effecting vertical deflection of an electron beam coupled to one of said units of multiple deflection apparatus and means for modifying said vertical deflection of an electron beam in accordance with movement of a film by said transport means coupled to another unit of said multiple deflection apparatus; signal generation and modification means coupled to said transport means, said first source of signals, and to said flying spot scanner tube of said second signal source means for effecting alteration in the scanning of said flying spot scanner tube in accordance with the operation of said transport means; and switching means selectively coupling said first and second signal source means to said image reproducer means of said color television receiver; whereby an image on said image reproducer means is immobilized during movement of a photographic film through said second signal source means due to alteration in the vertical deflection of the electron beam of the flying spot scanner tube.

* * * * *